United States Patent
Maruyama (10) Patent No.: US 12,449,048 B2
(45) Date of Patent: Oct. 21, 2025

(54) ROTARY VALVE

(71) Applicant: AISIN CORPORATION, Aichi (JP)

(72) Inventor: Koichi Maruyama, Kariya (JP)

(73) Assignee: AISIN CORPORATION, Aichi (JP)

( * ) Notice: Subject to any disclaimer, the term of this patent is extended or adjusted under 35 U.S.C. 154(b) by 11 days.

(21) Appl. No.: 18/555,283

(22) PCT Filed: Jun. 6, 2022

(86) PCT No.: PCT/JP2022/022798
§ 371 (c)(1),
(2) Date: Oct. 13, 2023

(87) PCT Pub. No.: WO2022/260006
PCT Pub. Date: Dec. 15, 2022

(65) Prior Publication Data
US 2024/0191806 A1    Jun. 13, 2024

(30) Foreign Application Priority Data
Jun. 7, 2021  (JP) .................. 2021-095072

(51) Int. Cl.
*F16K 11/16*  (2006.01)
*F16K 31/04*  (2006.01)

(52) U.S. Cl.
CPC .......... *F16K 11/165* (2013.01); *F16K 31/043* (2013.01)

(58) Field of Classification Search
CPC .... F16K 11/165; F16K 11/0856; F16K 11/14; F16K 31/041; F16K 31/043
See application file for complete search history.

(56) References Cited

U.S. PATENT DOCUMENTS 8,671,982 B2 *  3/2014  Stoermer ............ F16K 11/0856
                                                            123/41.1
9,404,594 B2 *  8/2016  Morein ............... F16K 11/0856
(Continued)

FOREIGN PATENT DOCUMENTS

CN    113251179 A     8/2021
CN    114517843 A *   5/2022  ............ F16K 11/087
(Continued)

OTHER PUBLICATIONS

CN 114517843 Translation (Year: 2020).*
(Continued)

*Primary Examiner* — Umashankar Venkatesan
(74) *Attorney, Agent, or Firm* — BUCHANAN INGERSOLL & ROONEY PC (57) ABSTRACT

A valve includes a housing, plural rotors in the housing, a linkage mechanism that links the rotors, and an electric actuator. The rotors include a drive rotor driven and rotated by the electric actuator and a driven rotor to which a driving rotational force is transmitted from the drive rotor via the linkage mechanism. The linkage mechanism includes a contact portion and a contacted portion. The linkage mechanism can select between a transmission mode and a non-transmission mode by selecting a rotational direction of the drive rotor, the transmission mode being a mode in which the contact portion is in contact with the contacted portion so as to transmit the driving rotational force to the driven rotor, and the non-transmission mode being a mode in which the contact portion is separated from the contacted portion so as not to transmit the driving rotational force to the driven rotor.

16 Claims, 7 Drawing Sheets

(56) References Cited

U.S. PATENT DOCUMENTS

| | | | |
|---|---|---|---|
| 9,841,115 B2* | 12/2017 | Gramss | F16K 31/04 |
| 10,203,044 B2* | 2/2019 | Dieterich | F01P 7/167 |
| 10,344,877 B2 | 7/2019 | Roche et al. | |
| 10,808,863 B2* | 10/2020 | Bugeja | F16K 11/165 |
| 2013/0048084 A1 | 2/2013 | Bartnick et al. | |
| 2015/0101693 A1* | 4/2015 | Enomoto | F16K 31/535 |
| | | | 137/597 |
| 2016/0003126 A1* | 1/2016 | Carns | F16K 5/0605 |
| | | | 251/304 |
| 2016/0201546 A1 | 7/2016 | Heldberg | |

FOREIGN PATENT DOCUMENTS

| | | |
|---|---|---|
| JP | 2018536128 A | 12/2018 |
| WO | 2014078255 A2 | 5/2014 |

OTHER PUBLICATIONS

The Extended European Search Report issued on Sep. 5, 2024, by the European Patent Office in corresponding European Patent Application No. 22820185.1. (8 pages).

International Search Report (PCT/ISA/210) with translation and Written Opinion (PCT/ISA/237) mailed on Jul. 19, 2022 by the Japanese Patent Office as the International Searching Authority for International Application No. PCT/JP2022/022798. (9 pages).

* cited by examiner

ROTARY VALVE

TECHNICAL FIELD

The present disclosure relates to rotary valves.

BACKGROUND ART

Patent Document 1 discloses a configuration of a rotary valve in which a stem shell is rotatably disposed in a valve housing having five ports and the stem shell is rotated to selectively couple preset ones of the five ports to allow fluid to flow between the coupled ports.

RELATED ART DOCUMENTS

Patent Documents

Patent Document 1: Japanese Unexamined Patent Application Publication (Translation of PCT Application) No. 2018-536128 (JP 2018-536128 A)

SUMMARY

Problem to be Solved

In the rotary valve described in Patent Document 1 (referred to as multiport-multimode valve in the document), the five ports are formed in such an attitude that the ports extend in a radial pattern from the stem shell.

Therefore, for example, when the rotary valve of Patent Document 1 is used to control the flow of engine cooling water in a vehicle such as an automobile or to control the flow of coolant for circulating thermal energy, hoses for supplying and discharging the fluid to the outer ends of the plurality of ports need to be connected to the rotary valve, which leads to restrictions in forming channels, such as an increase in length of the hoses.

Moreover, in the rotary valve of Patent Document 1, the flow direction of the fluid changes at a steep angle in the stem shell when controlling the flow of the fluid. This causes great fluid pressure loss and complicates the structure, which may also lead to an increase in overall size of the valve.

For these reasons, there is a demand for a valve that has less restrictions in connecting external channels thereto, that has less fluid pressure loss, and that can cause fluid to selectively flow between a plurality of ports.

Means for Solving the Problem

A characteristic configuration of a rotary valve according to the present disclosure is that the rotary valve includes: a housing including a plurality of supply ports to which fluid is supplied and a plurality of discharge ports from which fluid is sent; a plurality of rotors housed in the housing so as to be rotatable about a rotation axis, and each configured to rotate to cause the fluid from the plurality of supply ports to flow into a corresponding one of the plurality of discharge ports; a linkage mechanism configured to cause the plurality of rotors to rotate in conjunction with each other; and an electric actuator configured to drive and rotate the plurality of rotors, the plurality of rotors includes a drive rotor to which a driving rotational force of the electric actuator is transmitted and a driven rotor to which the driving rotational force is transmitted from the drive rotor via the linkage mechanism, and the linkage mechanism includes a contact portion formed in the drive rotor and a contacted portion formed in the driven rotor, and is configured to select between a transmission mode and a non-transmission mode by selecting a rotational direction of the drive rotor, the transmission mode being a mode in which the contact portion is in contact with the contacted portion so as to transmit the driving rotational force to the driven rotor, and the non-transmission mode being a mode in which the contact portion is separated from the contacted portion so as not to transmit the driving rotational force to the driven rotor.

According to this characteristic configuration, when the drive rotor is rotated in, for example, a forward direction by the driving rotational force of the electric actuator, the transmission mode can be selected in which the contact portion and the contacted portion of the linkage mechanism are in contact with each other so as to transmit the driving rotational force of the drive rotor to the driven rotor. The drive rotor and the driven rotor can thus be rotated together. On the other hand, when the drive rotor is rotated in, for example, a reverse direction, namely the opposite direction to the forward direction, by the driving rotational force of the electric actuator, the non-transmission mode can be selected in which the contact portion of the linkage mechanism is separated from the contacted portion of the linkage mechanism so as not to transmit the driving rotational force of the drive rotor to the driven rotor. Only the drive rotor can thus be rotated independently.

With this configuration, it allows to establish the transmission mode in which the drive rotor and the driven rotor are rotated by the same angle at the same time to control the flow of the fluid and the non-transmission mode in which the rotation angle of the drive rotor is made different from that of the driven rotor to control the flow of the fluid. Therefore, the number of selectable channels can be increased. As a result, a valve is configured that has less restrictions in forming channels, that has less fluid pressure loss, and that can cause fluid to selectively flow between a plurality of ports.

As a configuration in addition to the above configuration, the drive rotor and the driven rotor may be in such a positional relationship that the drive rotor and the driven rotor are located next to each other in a direction along the rotation axis. Each of the contact portion and the contacted portion may be located on a circumference of an imaginary circle about the rotation axis, either or both of the number of the contact portions and the number of the contacted portions are two or more. Either or both of the two or more contact portions and the two or more contacted portions are located at positions separated from each other in a circumferential direction of the imaginary circle.

According to this, for example, in the case where a pair of the contact portions is located on the circumference of the imaginary circle and the contacted portion is located at intermediate positions between the pair of contact portions in the circumferential direction, the drive rotor and the driven rotor can be rotated together by bringing the pair of contact portions into contact with the pair of contacted portions by rotation of the drive rotor. By reversely rotating the drive rotor from the state in which the contact portions and the contacted portions are in contact with each other, the contact portions are separated from the contacted portions. Only the drive rotor can thus be rotated in the reverse direction and set to a desired rotation angle.

As a configuration in addition to the above configuration, the linkage mechanism may include a pair of the contact portions located at positions sandwiching the rotation axis, and a pair of the contacted portions located at positions sandwiching the rotation axis. Each of the contact portions may include a first contact surface and a second contact surface that are perpendicular to a tangential direction to the imaginary circle, and each of the contacted portions may include a first contacted surface and a second contacted surface that are perpendicular to the tangential direction to the imaginary circle. The rotary valve may be switched from an initial position in which the second contact surfaces of the pair of contact portions and the second contacted surfaces of the pair of contacted portions are in contact with each other to a contact position in which the first contact surfaces of the contact portions are in contact with the first contacted surfaces of the pair of contacted portions, the rotary valve being switched from the initial position to the contact position by rotating the drive rotor by a set angle in one direction by the electric actuator in the non-transmission mode in which the pair of contact portions and the pair of contacted portions are separated from each other. The electric actuator may then be further driven and rotated in the one direction to rotate the drive rotor and the driven rotor together in the transmission mode with the pair of contact portions and the pair of contacted portions contacting each other.

According to this, the pair of contact portions and the pair of contacted portions form the linkage mechanism. By controlling driving rotation from the initial position in which the second contact surfaces and the second contacted surfaces are in contact with each other by using the electric actuator, only the drive rotor is rotated so as to separate the second contact surfaces from the second contacted surfaces (non-transmission mode). With this rotation, the rotary valve can be switched to the contact position in which the second contact surfaces and the second contacted surfaces are in contact with each other. With this switching from the initial position to the contact position, the flow of the fluid from the plurality of supply ports to the plurality of discharge ports can be switched. Moreover, by rotating the drive rotor and the driven rotor together from the contact position so as to keep the first contact surfaces and the first contact surfaces in contact with each other (transmission mode), the rotary valve can be set to a different position and the flow of the fluid flowing from the plurality of supply ports to the plurality of discharge ports can be controlled.

As a configuration in addition to the above configuration, the single drive rotor and the single driven rotor may be housed in the housing, the housing may include two of the supply ports and two of the discharge ports that correspond to the drive rotor and the driven rotor, and may further include an intermediate discharge port at an intermediate position between the drive rotor and the driven rotor. Either or both of the drive rotor and the driven rotor may be configured to be set as desired to a communicating attitude in which the fluid supplied to a corresponding one of the supply ports is sent to the discharge port and a blocking attitude in which the fluid supplied to the corresponding supply port is sent to the intermediate discharge port without being sent to the discharge port.

According to this, by setting the rotational attitude of the drive rotor and the rotational attitude of the driven rotor, the rotor can be set to the communicating attitude, so that the fluid supplied from the supply port can be supplied to the discharge port. The rotor can also be set to the blocking attitude, so that the flow of the fluid from the supply port to the discharge port can be blocked and the fluid can be supplied from the supply port to the intermediate discharge port.

As a configuration in addition to the above configuration, each of the drive rotor and the driven rotor may include: a pair of disk portions having a disk shape about the rotation axis and located at positions sandwiching the corresponding supply port and the discharge port in an attitude perpendicular to the rotation axis; a control plate portion formed integrally with the pair of disk portions at an intermediate position between the pair of disk portions and dividing each of the drive rotor and the driven rotor into a first region and a second region; and an opening that is located in the disk portion of each of the drive rotor and the driven rotor that faces the intermediate discharge port, and that communicates with the second region. Each of the drive rotor and the driven rotor may be in the communicating attitude when the first region faces the corresponding supply port, and may be in the blocking attitude when the second region faces the corresponding supply port.

According to this, each of the drive rotor and the driven rotor includes the pair of disk portions having a disk shape and the control plate portion formed integrally with the disk portions at a position between the disk portions. The control plate portion divides the rotor into the first region and the second region. Of the disk portions, the disk portion facing the intermediate discharge port has the opening communicating with the second region. With such a configuration, when the first regions of the drive rotor and the driven rotor are caused to face corresponding ones of the supply ports, each of the drive rotor and the driven rotor can be switched to the communicating attitude in which the fluid from the supply port is sent to the discharge port. When the second regions of the drive rotor and the driven rotor are caused to face corresponding ones of the supply ports, each of the drive rotor and the driven rotor can send the fluid from the supply port to the intermediate discharge port through the opening of the disk portion without sending the fluid from the supply port to the discharge port.

As a configuration in addition to the configuration, either or both of the contact portion and the contacted portion may be configured as a rib-like body extending along the rotation axis at a position near an inner periphery of the housing. When the control plate portion is in the communicating attitude, the rib-like body may be located at a position overlapping the intermediate discharge port.

In the case where the driving rotor and the driven rotor include the pair of disk portions and the control plate portion, the fluid is not sent to the intermediate discharge port when the drive rotor and the driven rotor are at such a rotation angle that the drive rotor and the driven rotor send the fluid from the supply port to the discharge port. Therefore, the above configuration in which the rib-like body is located at a position overlapping the intermediate discharge port when either or both of the drive rotor and the driven rotor is in the communicating attitude can reduce the fluid trying to flow into the intermediate discharge port and reduce an improper flow of the fluid even if, for example, the fluid leaks from either the drive rotor or the driven rotor.

As a configuration in addition to the above configuration, the plurality of supply ports may include a first supply port and a second supply port, and the plurality of discharge ports may include a first discharge port, a second discharge port, and a third discharge port. By driving and rotating the drive rotor by the electric actuator, the rotary valve may be switched to: a first position in which the first supply port and the first discharge port communicate with each other and the second supply port and the second discharge port communicate with each other; a second position in which the first supply port and the third discharge port communicate with each other and the second supply port and the second discharge port communicate with each other; a third position in which the first supply port and the second supply port communicate with the third discharge port and the first supply port and the first discharge port communicate with each other; and a fourth position in which the entire first supply port and the entire second supply port communicate with the third discharge port.

According to this, the rotary valve can be configured that can be switched to the following positions by driving and rotating the drive rotor by the electric actuator: the first position in which the first supply port and the first discharge port communicate with each other and the second supply port and the second discharge port communicate with each other; the second position in which the first supply port and the third discharge port communicate with each other and the second supply port and the second discharge port communicate with each other; the third position in which the first supply port and the second supply port communicate with the third discharge port and the first supply port and the first discharge port communicate with each other; and the fourth position in which the entire first supply port and the entire second supply port communicate with the third discharge port.

As a configuration in addition to the above configuration, the single drive rotor and the single driven rotor may be housed in the housing, the housing may include two of the supply ports and two of the discharge ports that correspond to the drive rotor and the driven rotor, and may further include an intermediate discharge port at an intermediate position between the drive rotor and the driven rotor. Either or both of the drive rotor and the driven rotor may be configured to be set as desired to a communicating attitude in which the fluid supplied to a corresponding one of the supply ports is sent to the discharge port, a blocking attitude in which the fluid supplied to the corresponding supply port is sent to the intermediate discharge port without being sent to the discharge port, and a double-communicating attitude in which the fluid supplied to the supply port is sent to a corresponding one of the discharge ports and the intermediate discharge port. The rotary valve may be switched to: a first position in which the drive rotor and the driven rotor are set to the communicating attitude in a state where the contact portions and the contacted portions are in the initial position; a second position in which the drive rotor is set to the blocking attitude with the driven rotor kept in the communicating attitude in a state where the contact portions and the contacted portions have been switched to the contact position; a third position in which, by rotating the drive rotor by the set angle in the one direction from the second position by the electric actuator, the driven rotor is set to the blocking attitude by transmission of the linkage mechanism from the drive rotor, and the drive rotor is set to the double-communicating attitude; and a fourth position in which, by rotating the drive rotor by the set angle in an opposite direction to the one direction from the third position by the electric actuator, the drive rotor is set to the blocking attitude with the driven rotor kept in the blocking attitude.

According to this, in the state where the contact portions and the contacted portions are in the initial position, the rotary valve is in the first position in which the drive rotor and the driven rotor are in the communicating attitude and the fluid is sent from the two support ports to the corresponding discharge ports. By driving and rotating the electric actuator in the one direction from the first position, the rotary valve is switched to the contact position in which the contact portions and the contacted portions are in contact with each other. The rotary valve can thus be set to the second position in which the drive rotor is set to the blocking attitude with the driven rotor kept in the communicating attitude. In the second position, the fluid from the supply port corresponding to the drive rotor is sent to the intermediate discharge port while maintaining the state in which the fluid from the supply port corresponding to the driven rotor is sent to the discharge port. By driving and rotating the electric actuator in the one direction from the second position, the drive rotor and the driven rotor are rotated with the contact portions and the contacted portions contacting each other. The rotary valve can thus be set to the third position in which the driven rotor is set to the blocking attitude and the drive rotor is set to the double-communicating attitude. In the third position, the fluid from the supply port corresponding to the driven rotor is sent to the intermediate discharge port, and the fluid from the supply port corresponding to the drive rotor is sent to the corresponding discharge port and the intermediate discharge port. By driving the electric motor in the reverse direction from the third position, the contact portions are separated from the contacted portions. Therefore, the rotary valve is set to the fourth position in which the drive rotor reaches the blocking attitude with the driven rotor kept in the blocking attitude. In the fourth position, the fluid from the pair of supply ports is sent to the intermediate discharge port.

As a configuration in addition to the above configuration, the drive rotor and the driven rotor may be configured to be set as desired to the communicating attitude, the blocking attitude, and a double-communicating attitude in which the fluid supplied to the supply port is sent to a corresponding one of the discharge ports and the intermediate discharge port. The rotary valve may be switched to: a first position in which the drive rotor and the driven rotor are both set to the communicating attitude; a second position in which, by rotating the drive rotor by a set angle in one direction from the first position by the electric actuator, the drive rotor is set to the blocking attitude with the driven rotor kept in the communicating attitude; a third position in which, by rotating the drive rotor by the set angle in the one direction from the second position by the electric actuator, the driven rotor is set to the blocking attitude by transmission of the linkage mechanism from the drive rotor, and the drive rotor is set to the double-communicating attitude; and a fourth position in which, by rotating the drive rotor by the set angle in an opposite direction to the one direction from the third position by the electric actuator, the drive rotor is set to the blocking attitude with the driven rotor kept in the blocking attitude.

According to this, the rotary valve can be set to the first position in which the drive rotor and the driven rotor are both in the communicating attitude. In the first position, the fluid from the two supply ports is sent to their corresponding discharge ports. By rotating the electric motor by the set angle in the one direction from the first position, the rotary valve can be set to the second position in which only the drive rotor is set to the blocking attitude with the driven rotor kept in the communicating attitude. In the second position, the fluid from the supply port for the drive rotor is sent to the intermediate discharge port while maintaining the flow of the fluid that is produced by the driven rotor. By rotating the electric motor by the set angle in the one direction from the second position, the rotary valve can be set to the third position in which the driven rotor is set to the blocking attitude and the drive rotor is set to the double-communicating attitude. In the third position, the fluid from the supply port corresponding to the driven rotor is sent to the intermediate discharge port, and the fluid from the supply port corresponding to the drive rotor is sent to the discharge port corresponding to the drive rotor and the intermediate discharge port. By rotating the electric motor by the set angle in the opposite direction from the third position, the rotary valve can be set to the fourth position in which only the drive rotor is set to the blocking attitude with the driven rotor kept in the blocking attitude. In the fourth position, the fluid from the two supply ports is sent to the intermediate discharge port.

DETAILED DESCRIPTION

Figure 1:
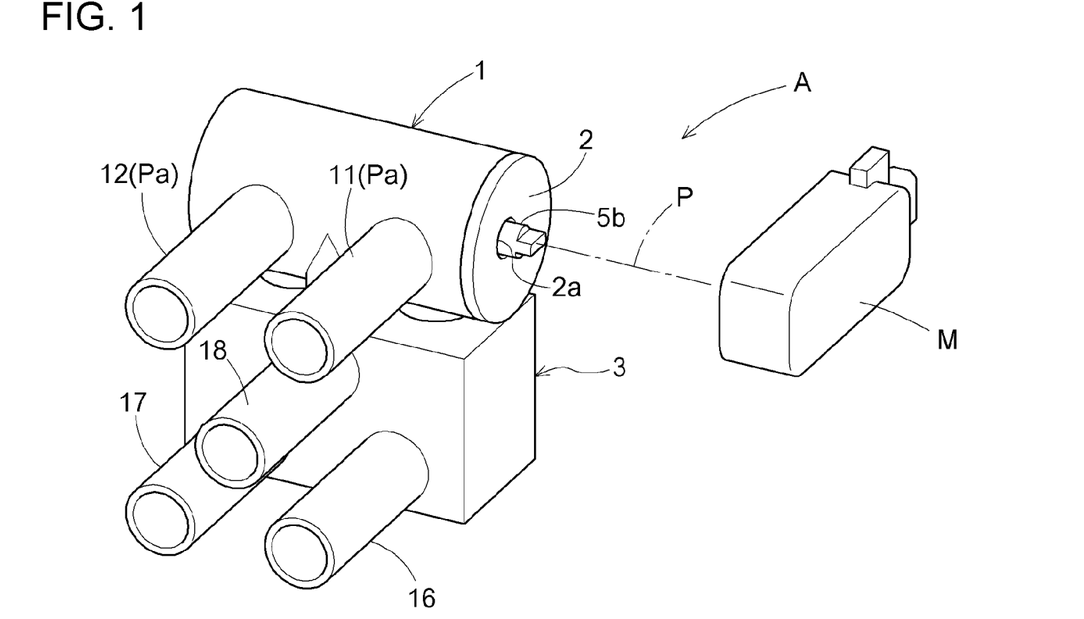
FIG. 1 is a perspective view showing a rotary valve.
Figure 2:
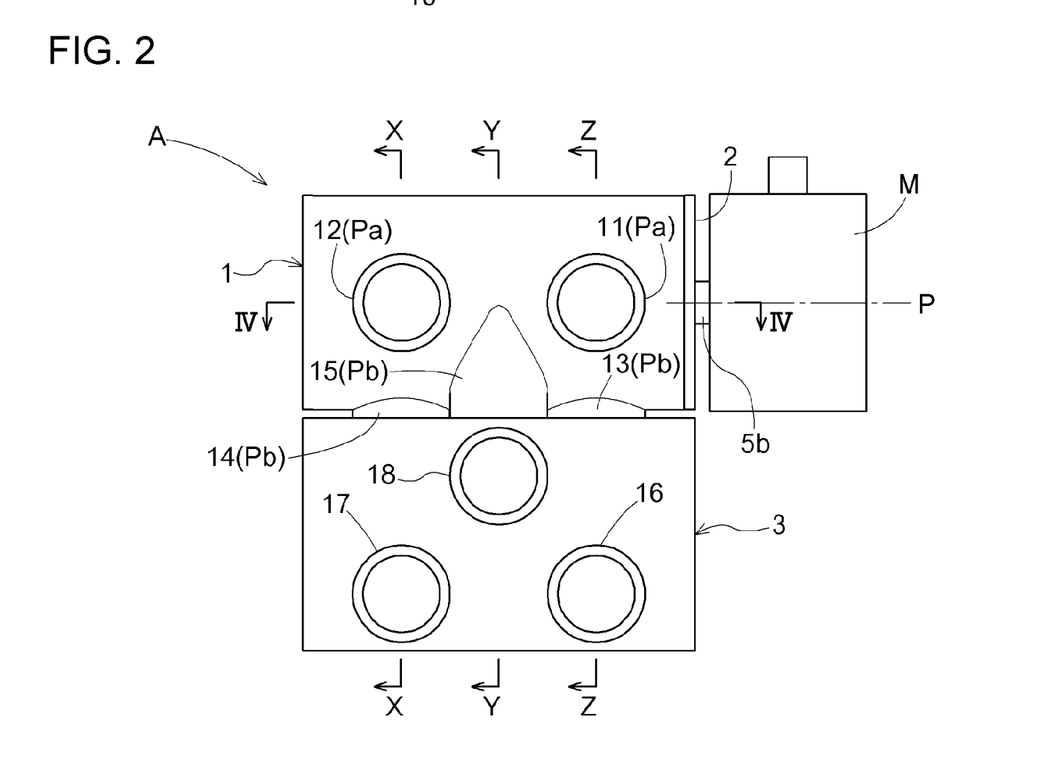
FIG. 2 is a front view of the rotary valve.
Figure 3:
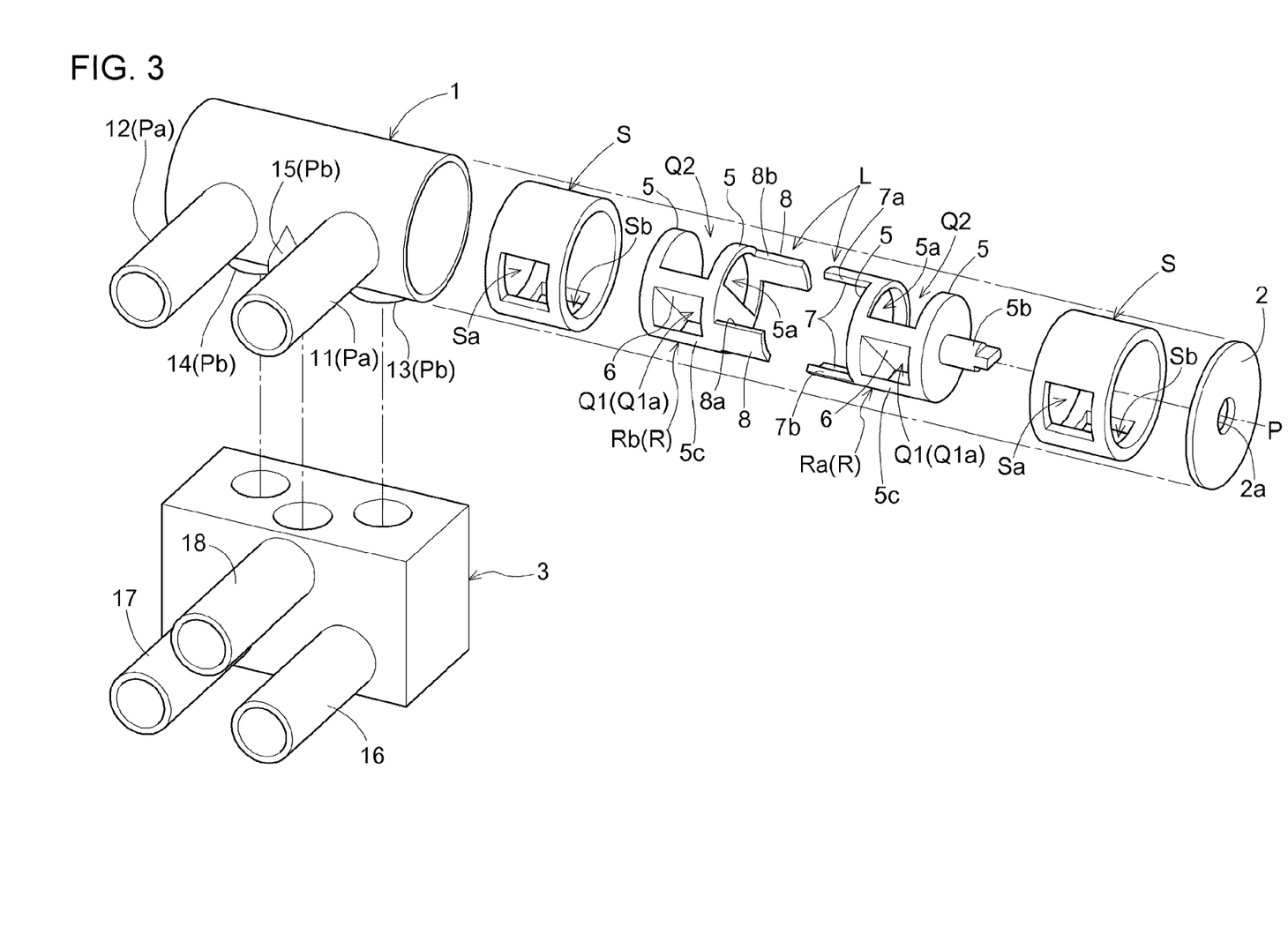
FIG. 3 is an exploded perspective view of the rotary valve.

Hereinafter, an embodiment of the present disclosure will be described with reference to the drawings.
[Basic Configuration]
As shown in FIGS. 1 to 3, a rotary valve A includes a valve housing 1 (example of the housing), two rotors R housed in the valve housing 1 so as to be rotatable about a rotation axis P, a linkage mechanism L that links the two rotors R, and an electric motor M (example of the electric actuator) configured to drive and rotate the two rotors R.

This rotary valve A is used to control the flow of cooling water (example of the fluid) for an engine or motor, inverter, and battery (not shown) of a vehicle such as a passenger car. The rotary valve A is not necessarily used to control the flow of cooling water, but may be used to control the flow of oil or coolant.

Although the rotary valve A functions in any attitude as a valve, the positional relationships in the vertical direction, the front-rear direction, the left-right direction, etc. will be described below based on the attitude shown in FIG. 1. In this rotary valve A, the valve housing 1, the two rotors R, and an end wall member 2 are made of a resin material.

This rotary valve A is used in a form in which a channel housing 3 that changes the flow direction of cooling water (fluid) discharged from three discharge ports Pb in the lower surface of the valve housing 1 is connected to the lower surface of the valve housing 1. This rotary valve A can also be used without connecting the channel housing 3.

As shown in FIGS. 1 to 3, the valve housing 1 (housing) is in the shape of a bottomed tube about the rotation axis P, and has the end wall member 2 at its opening portion. The valve housing 1 has two supply ports Pa on the front side and the three discharge ports Pb on the bottom side. The rotary valve A is configured to selectively send cooling water (example of the fluid) supplied to the two supply ports Pa into the three discharge ports Pb by driving and rotating the rotors R with the driving force of the electric motor M (electric actuator).

Of the two rotors R of this rotary valve A, the rotor R that is directly driven by the electric motor M is referred to as drive rotor Ra, and the rotor R to which the driving rotational force of the drive rotor Ra is transmitted via the linkage mechanism L is referred to as driven rotor Rb. The drive rotor Ra and the driven rotor Rb are disposed next to each other in the direction along the rotation axis P. As shown in FIGS. 1 and 3, the end wall member 2 is disposed adjacent to the drive rotor Ra, and the end wall member 2 has a through hole 2a through which an operating shaft 5b of the drive rotor Ra is inserted. The driving rotational force of the electric motor M is transmitted to the operating shaft 5b.

The electric motor M (electric actuator) is configured as a brushless DC motor. The electric motor M can output a driving force reduced by a gear reduction mechanism and can be rotated by a set angle in a forward direction F and a reverse direction B (see FIGS. 6 and 7).

The rotary valve A includes tubular seal members S, S between the outer peripheries of the two rotors R (drive rotor Ra and driven rotor Rb) and the inner surface of the valve housing 1.

[Valve Housing]
As shown in FIGS. 1 to 5, of the two supply ports Pa, the tubular member that supplies cooling water to the drive rotor Ra is referred to as first supply port 11, and the tubular member that supplies cooling water to the driven rotor Rb is referred to as second supply port 12. The two supply ports Pa, that is, the first supply port 11 and the second supply port 12, are arranged side by side at a set interval therebetween in the direction along the rotation axis P.

Considering the axis of the tubular member serving as the first supply port 11 and the axis of the tubular member serving as the second supply port 12, the attitude of each tubular member is set so that these axes are perpendicular to the rotation axis P.

As shown in FIGS. 1 to 7, of the three discharge ports Pb, the tubular member that sends cooling water from the drive rotor Ra is referred to as first discharge port 13, and the tubular member that sends cooling water from the driven rotor Rb is referred to as second discharge port 14. The tubular member that is disposed between the first discharge port 13 and the second discharge port 14 and discharges cooling water is referred to as third discharge port 15.

As described above, in the valve housing 1, the first discharge port 13 and the second discharge port 14 are arranged side by side with a set interval therebetween in the direction along the rotation axis P, and the third discharge port 15 (example of the intermediate discharge port) is disposed at an intermediate position therebetween.

The distance from one end of the valve housing 1 to the first supply port 11 and the distance from this end of the valve housing 1 to the first discharge port 13 are set to be equal to each other, and the distance from this end of the valve housing 1 to the second supply port 12 and the distance from this end of the valve housing 1 to the second discharge port 14 are set to be equal to each other. That is, the axis of the tubular member serving as the first supply port 11 and the axis of the first discharge port 13 are on the same plane, and the axis of the tubular member serving as the second supply port 12 and the axis of the second discharge port 14 are on the same plane.

Considering the axis of the tubular member serving as the first discharge port 13 and the axis of the second discharge port 14, the first discharge port 13 and the second discharge port 14 are in such an attitude that these axes are perpendicular to the rotation axis P. Considering the axis of the third discharge port 15 (intermediate discharge port), this axis is located closer to the front side of the valve housing 1 than the axis of the first discharge port 13 and the axis of the second discharge port 14 and does not cross the rotation axis P.

[Channel Housing]

As shown in FIGS. 1 to 3, the channel housing 3 includes a tubular first discharge channel 16 that discharges cooling water from the first discharge port 13, a tubular second discharge channel 17 that discharged cooling water from the second discharge port 14, and a tubular third discharge channel 18 that discharges cooling water from the third discharge port 15.

The first discharge channel 16, the second discharge channel 17, and the third discharge channel 18 are each in an attitude parallel to the tubular member serving as the first supply port 11 and the tubular member serving as the second supply port 12, and the tubular members serving as these discharge channels each have an opening that is open in the same direction.

[Rotors]

Figure 4:
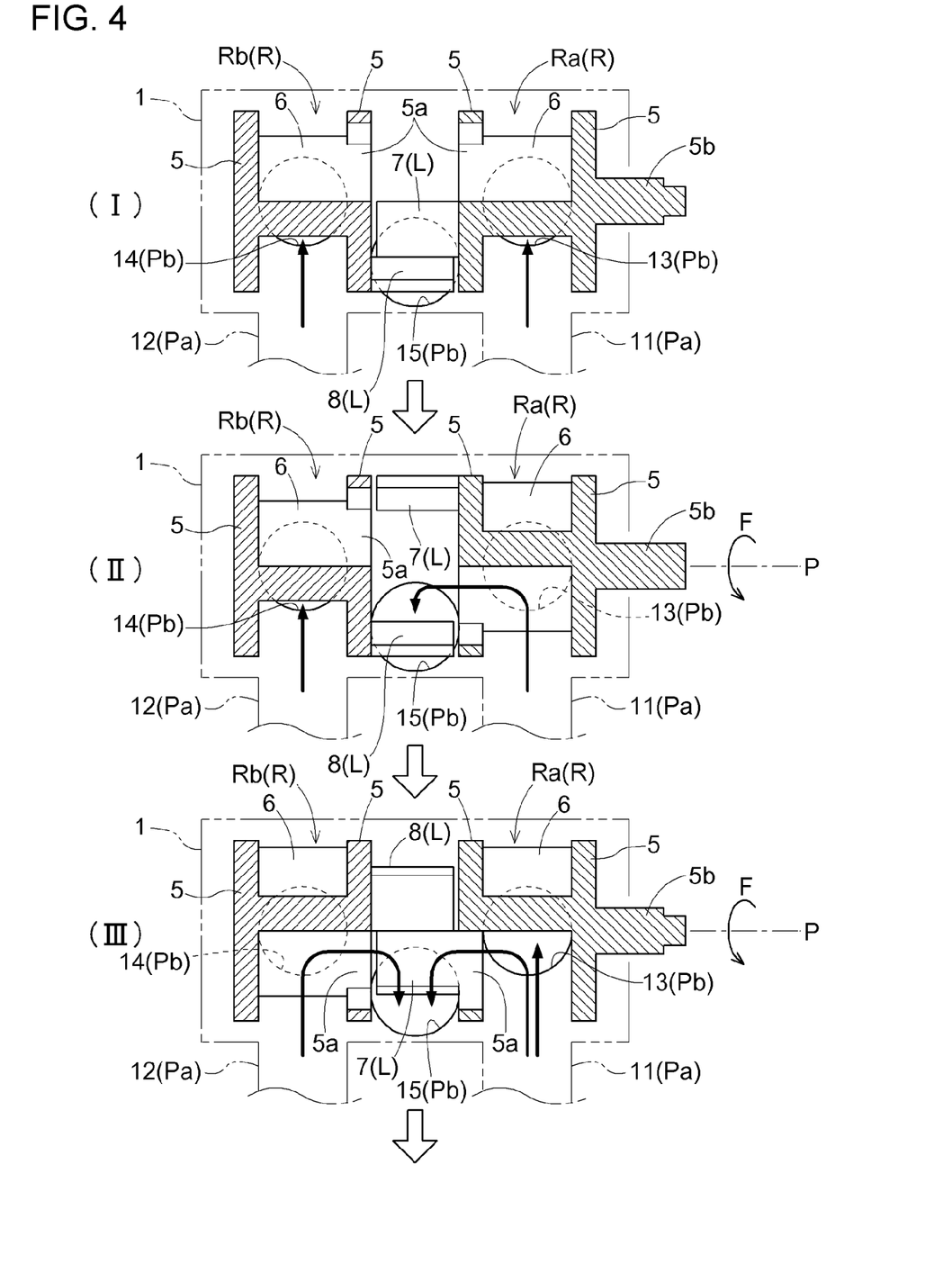
FIG. 4 illustrates the states of a drive rotor and a driven rotor and the flow of cooling water in first to third positions.
Figure 5:
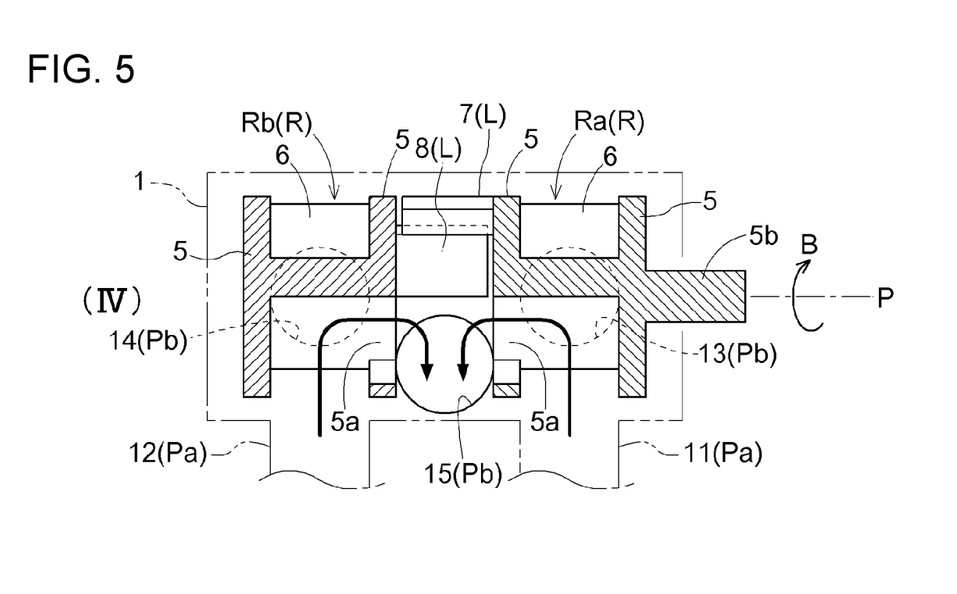
FIG. 5 illustrates the states of the drive rotor and the driven rotor and the flow of cooling water in a fourth position.

As shown in FIGS. 3 to 5, the drive rotor Ra and the driven rotor Rb each have a pair of disk-shaped disk portions 5 that are perpendicular to the rotation axis P, and a single control plate portion 6 that is formed integrally with the pair of disk portions 5 at an intermediate position between the pair of disk portions 5 and that is in an attitude parallel to the rotation axis P.

Each of the drive rotor Ra and the driven rotor Rb has its internal space divided into a first region Q1 and a second region Q2 by the control plate portion 6. Of these regions, a boundary frame 5c is disposed in the first region Q1, and a supply opening Q1a and a discharge opening Q1b corresponding to a supply opening Sa and a discharge opening Sb formed in the seal member S that will be described later are formed by this boundary frame 5c. As will be described in detail later, when the rotors R are set to a communicating attitude, each of the drive rotor Ra and the driven rotor Rb allows the flow of cooling water from the supply port Pa into the discharge port Pb through the first region Q1. When the rotors R are set to a blocking attitude, each of the drive rotor Ra and the driven rotor Rb blocks the flow of the cooling water from the supply port Pa into the discharge port Pb in the second region Q2.

The pair of disk portions 5 is formed so that their outer peripheries contact the inner peripheral surface of the seal member S. The control plate portion 6 is formed in such an attitude that the control plate portion 6 extends across the disk portions 5 in the diametrical direction as viewed in the direction along the rotation axis P. The positions of the outer ends in the radial direction of the control plate portion 6 coincide with the positions of the outer peripheries of the disk portions 5.

Of the pairs of disk portions 5 formed in the drive rotor Ra and the driven rotor Rb, the disk portions 5 facing the third discharge port 15 each have an opening 5a communicating with the second region Q2. When the drive rotor Ra and the driven rotor Rb are in the blocking attitude, each opening 5a supplies fluid from the supply port Pa into the third discharge port 15 through the second region Q2.

Figure 6:
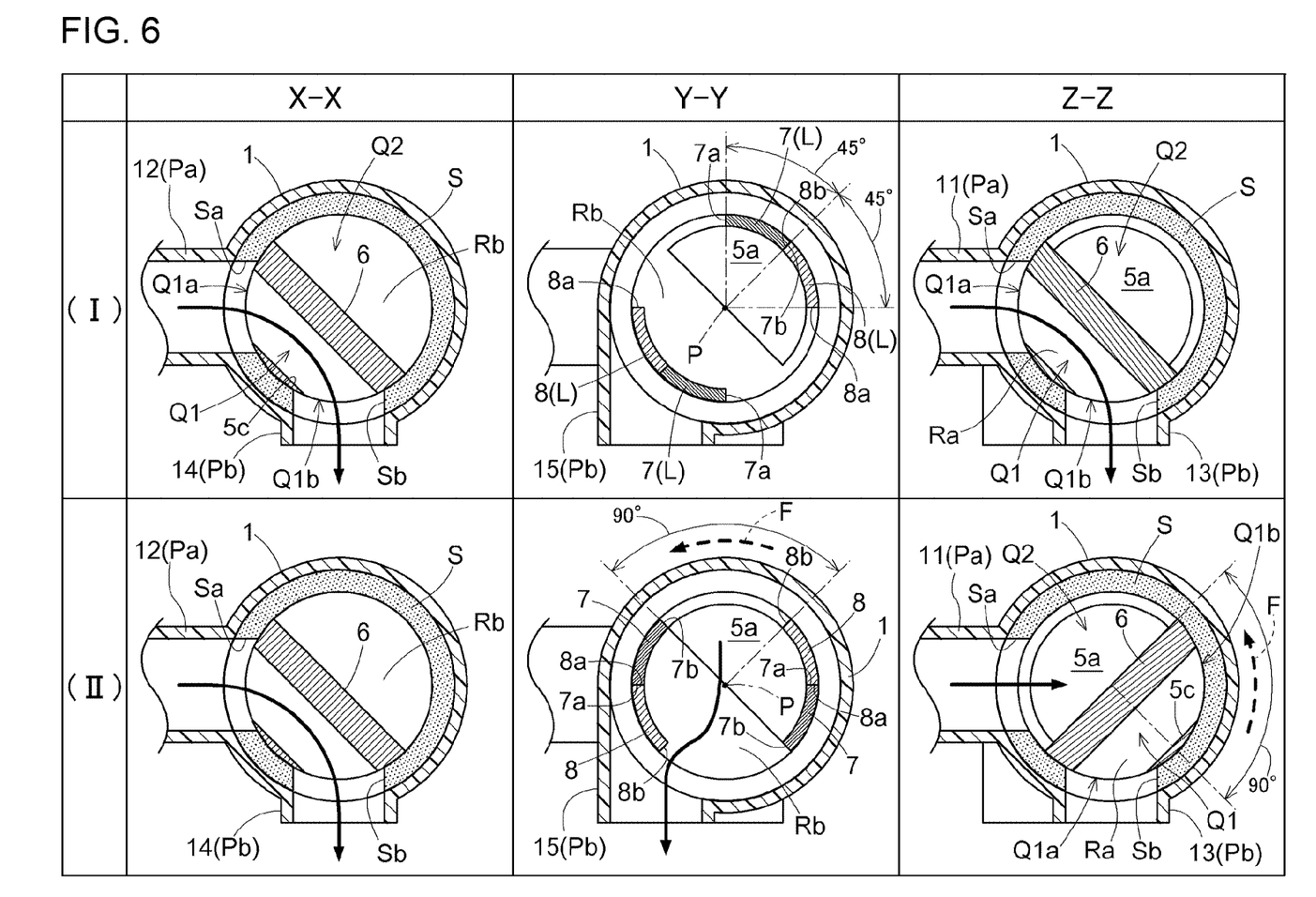
FIG. 6 illustrates the states of the rotors in the first and second positions in sections taken along lines X-X, Y-Y, and Z-Z in FIG. 2.

The drive rotor Ra and the driven rotor Rb can therefore be set to, for example, the communicating attitude shown by the position (I) in the upper part of FIG. 4 or the communicating attitude shown in the row (I) of FIG. 6 by rotating the drive rotor Ra and the driven rotor Rb about the rotation axis P. With this setting, the drive rotor Ra supplies cooling water from the supply port Pa (first supply port 11) to the discharge port Pb (first discharge port 13) through the first region Q1, and the driven rotor Rb supplies cooling water from the supply port Pa (second supply port 12) to the discharge port Pb (second discharge port 14) through the first region Q1. When cooling water flows in the first region Q1 as described above, the cooling water flows from the supply opening Q1a into the discharge opening Q1b.

Figure 7:
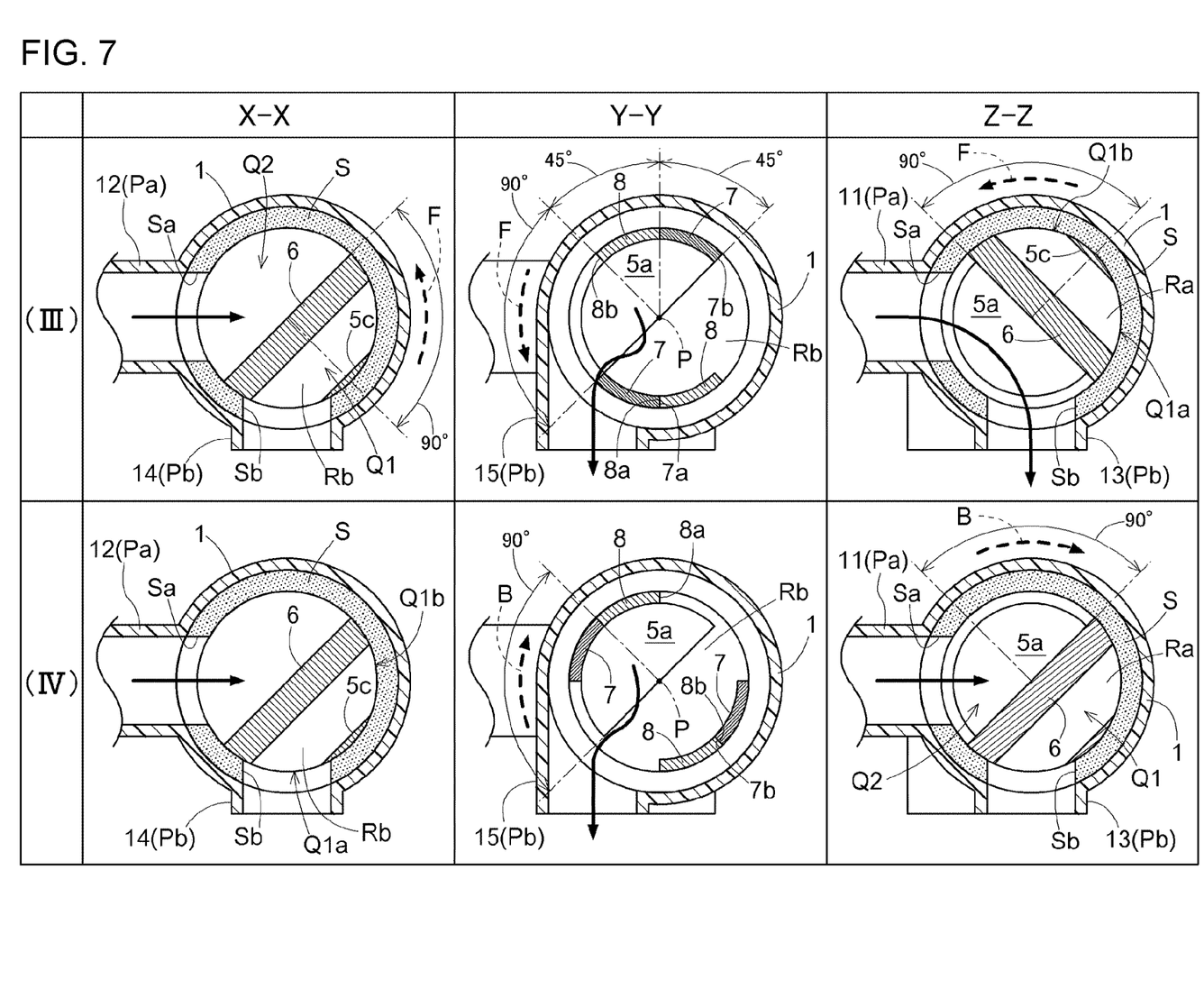
FIG. 7 illustrates the states of the rotors in the third and fourth positions in sections taken along lines X-X, Y-Y, and Z-Z in FIG. 2.

Therefore, for example, the drive rotor Ra and the driven rotor Rb can be set to the blocking attitude shown by the position (IV) in FIG. 5 or the blocking attitude shown in the row (IV) of FIG. 7. With this setting, cooling water from the supply port Pa (first supply port 11) reaches the second region Q2 of the drive rotor Ra, but the control plate portion 6 blocks the flow of the cooling water into the discharge port Pb (second supply port). Cooling water from the supply port Pa (second supply port 12) also reaches the second region Q2 of the driven rotor Rb, but the control plate portion 6 blocks the flow of the cooling water into the discharge port Pb (second discharge port 14).

The drive rotor Ra and the driven rotor Rb are also configured to supply cooling water from the supply ports Pa (first supply port 11 and second supply port 12) into the third discharge port 15 through the second regions Q2 and the openings 5a when the drive rotor Ra and the driven rotor Rb are set to the blocking attitude.

In particular, in this rotary valve A, by rotating only the drive rotor Ra in the forward direction F from the state of the position (I) and thus setting the rotary valve A to a second position shown by the position (II) in the middle part of FIG. 4, the drive rotor Ra can be set to the blocking attitude and the driven rotor Rb can be set to the communicating attitude, as will be described later. By further rotating the drive rotor Ra in the forward direction F, the drive rotor Ra can also be set to a double-communicating attitude (in which cooling water is supplied to both the first discharge port 13 and the third discharge port 15) shown by the position (III) in the lower part of FIG. 4. By setting the drive rotor Ra to the double-communicating attitude, cooling water from the supply port Pa (first supply port 11) can be directed to the third discharge port 15 through the second region Q2 and the opening 5a, and at the same time, the cooling water from the supply port Pa can be directed to the first discharge port 13 through the second region Q2. When the drive rotor Ra is rotated from the position (II) to the position (III), the driven rotor Rb is also rotated, and is set to the blocking attitude in the position (III).

[Seal Members]

As shown in FIG. 3, the seal members S are formed by molding rubber or flexibly deformable resin into a generally tubular shape, and are individually disposed in two regions surrounding the outer peripheries of the two rotors R (drive rotor Ra and driven rotor Rb).

Each seal member S has the supply opening Sa that allows cooling water from the supply port Pa to pass therethrough, and the discharge opening Sb through which the cooling water is sent into the discharge port Pb. In this rotary valve A, the third discharge port 15 is disposed at an intermediate position between the two seal members S.

[Linkage Mechanism]

As shown in FIGS. 3 to 7, the linkage mechanism L includes a pair of contact ribs 7, 7 (example of the contact portion and the rib-like body) formed integrally with the drive rotor Ra, and contacted ribs 8, 8 (example of the contacted portion and the rib-like body) formed integrally with the driven rotor Rb.

The linkage mechanism L can establish a transmission mode in which the drive rotor Ra and the driven rotor Rb are rotated together by bringing the contact ribs 7 into contact with the contacted ribs 8 and rotating the drive rotor Ra while pushing the contacted ribs 8 by the contact ribs 7. The linkage mechanism L can also establish a non-transmission mode in which only the drive rotor Ra is rotated by rotating the drive rotor Ra in the opposite direction so as to separate the contact ribs 7 from the contacted ribs 8.

The pair of contact ribs 7 is formed in such an attitude that the pair of contact ribs 7 protrudes along the rotation axis P from the surface of the drive rotor Ra that faces the driven rotor Rb. The pair of contact ribs 7 is located on the circumference of an imaginary circle about the rotation axis P and is disposed at positions facing each other with the rotation axis P interposed therebetween. As shown in FIGS. 3 to 7, each of the pair of contact ribs 7 has a first contact surface 7a and a second contact surface 7b that are perpendicular to the tangential direction to the imaginary circle. In the present embodiment, the circumference of the imaginary circle is the peripheral edge of the disk portion 5 of the drive rotor Ra.

Similarly, the pair of contacted ribs 8 is formed in such an attitude that the pair of contacted ribs 8 protrudes along the rotation axis P from the surface of the driven rotor Rb that faces the drive rotor Ra. The pair of contacted ribs 8 is located on the circumference of an imaginary circle about the rotation axis P and is disposed at positions facing each other with the rotation axis P interposed therebetween. As shown in FIGS. 3 to 7, the pair of contacted ribs 8 has a first contacted surface 8a and a second contacted surface 8b that are perpendicular to the tangential direction to the imaginary plane. In the present embodiment, the circumference of the imaginary circle is the peripheral edge of the disk portion 5 of the driven rotor Rb.

Since each of the contact ribs 7 and the contacted ribs 8 of the linkage mechanism L is located in the circumference pattern of the imaginary circle about the rotation axis P, each of the contact ribs 7 and the contacted ribs 8 has a predetermined width in the direction along the circumference, protrudes by a predetermined length in the direction along the rotation axis P, and has an arc shape in the direction along the rotation axis P. As shown in FIGS. 6 and 7, in the present embodiment, each of the contact ribs 7 and the contacted ribs 8 has an arc length with a central angle of 45° around the rotation axis P, and each of the pair of contact ribs 7, 7 and the pair of contacted ribs 8, 8 is disposed at positions with a central angle of 180°.

The drive rotor Ra is rotated in the forward direction F and the reverse direction B shown in FIGS. 6 and 7 by the driving rotational force of the electric motor M. In particular, when the drive rotor Ra is driven and rotated in the forward direction F and the first contact surfaces 7a of the pair of contact ribs 7 and the first contacted surfaces 8a of the pair of contacted ribs 8 come into contact with each other, the transmission mode can be established in which the drive rotor Ra and the driven rotor Rb are rotated together in the forward direction F while maintaining this contact state. In the present embodiment, the circumference of the imaginary circle is the peripheral edge of the disk portion 5 of the driven rotor Rb.

Similarly, when the drive rotor Ra is driven and rotated in the reverse direction B and the second contact surfaces 7b of the pair of contact ribs 7 and the second contacted surfaces 8b of the pair of contacted ribs 8 come into contact with each other, the transmission mode can be established in which the drive rotor Ra and the driven rotor Rb are rotated together in the reverse direction B while maintaining this contact state.

In particular, as shown in the row (I) of FIG. 6 or the row (IV) of FIG. 7, when in the first position (I) or the fourth position (IV), the second contact surfaces 7b of the pair of contact ribs 7 and the second contacted surfaces 8b of the pair of contacted ribs 8 are in contact with each other.

When the drive rotor Ra is driven and rotated in the forward direction F in this contact state, the second contact surfaces 7b of the pair of contact ribs 7 are separated from the second contacted surfaces 8b of the pair of contacted ribs 8, and only the drive rotor Ra is rotated in the forward direction F. The non-transmission mode can thus be established. When the drive rotor Ra is driven and rotated in the reverse direction B in the contact state in the first position (I) or the fourth position (IV), the drive rotor Ra and the driven rotor Rb are rotated together in the reverse direction B while keeping the second contact surfaces 7b of the pair of contact ribs 7 and the second contacted surfaces 8b of the pair of contacted ribs 8 in contact with each other. The transmission mode can thus be established.

In particular, as shown in the row (II) of FIG. 6 or the row (III) of FIG. 7, when in the second position (II) or the third position (III), the first contact surfaces 7a of the pair of contact ribs 7 and the first contacted surfaces 8a of the pair of contacted ribs 8 are in contact with each other.

When the drive rotor Ra is driven and rotated in the forward direction F in this contact state, the drive rotor Ra and the driven rotor Rb are rotated in the forward direction F while keeping the first contact surfaces 7a of the pair of contact ribs 7 and the first contacted surfaces 8a of the pair of contacted ribs 8 in the contact state. The transmission mode can thus be established. When the drive rotor Ra is driven and rotated in the reverse direction B in the contact state in the second position (II) or the third position (III), the first contacted surfaces 8a of the pair of contacted ribs 8 are separated from the first contact surfaces 7a of the pair of contact ribs 7, and only the drive rotor Ra is rotated in the reverse direction B. The non-transmission mode can thus be established.

[Switching Modes]

Figure 8:
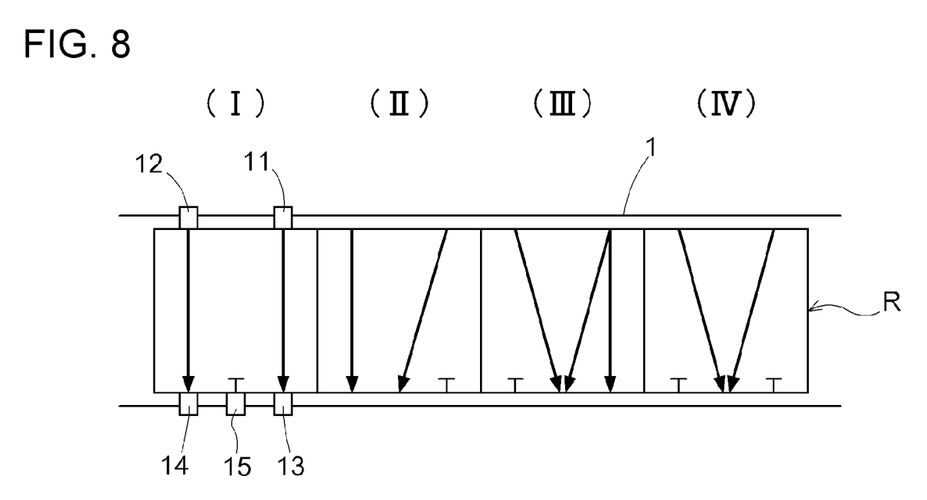
FIG. 8 illustrates channels in each position of the rotary valve.

The rotary valve A controls the rotational attitude of the rotors R (drive rotor Ra and driven rotor Rb) by the driving rotational force of the electric motor M to switch the channel among the first position (I), the second position (II), the third position (III), and the fourth position (IV) as shown in FIG. 8. By switching the position as described above, the flow of cooling water can be controlled as shown by each position in FIG. 8.

The initial position of this rotary valve A is the first position (I) shown in the row (I) of FIG. 6, and the rotary valve A can be switched to the second position (II) shown in the row (II) of FIG. 6 (example of the contact position) by rotating the drive rotor Ra by 90° in the forward direction F by the driving rotational force of the electric motor M. The rotary valve A is also configured to be switched to the third position (III) shown in the row (III) of FIG. 7 by further rotating the drive rotor Ra by 90° in the forward direction F, and then switched to the fourth position (IV) shown in the row (IV) of FIG. 6 by rotating the drive rotor Ra by 90° in the reverse direction B.

In particular, this rotary valve A is configured to be set to the first position (I) (initial position) by further rotating the drive rotor Ra by 90° in the reverse direction B from the fourth position (IV).

[Switching Mode: First Position (I)]

When the rotary valve A is in the first position (I) as shown by the position (I) in the upper part of FIG. 4 or the row (I) of FIG. 6, the drive rotor Ra and the driven rotor Rb are in the communicating attitude. In the first position (I), the second contact surfaces 7b of the pair of contact ribs 7 and the second contacted surfaces 8b of the pair of contacted ribs 8 are in contact with each other. In the first position (I), one set out of the pair of contact ribs 7 and the pair of contacted ribs 8 is positioned to cover the third discharge port 15.

Therefore, in the first position (I), cooling water supplied to the first supply port 11 flows into the first discharge port 13 and further flows into the first discharge channel 16 of the channel housing 3. Cooling water supplied to the second supply port 12 flows into the second discharge port 14 and further flows into the second discharge channel 17 of the channel housing 3. In this first position (I), no fluid is sent to the third discharge port 15.

[Switching Mode: Second Position (II)]

As shown in the position (II) in the middle part of FIG. 4 or the row (II) of FIG. 6, the second position (II) is set by rotating the drive rotor Ra by 90° in the forward direction F from the first position (I) by driving rotation of the electric motor M. In the second position (II), the second contact surfaces 7b of the pair of contact ribs 7 are separated from the second contacted surfaces 8b of the pair of contacted ribs 8, and the drive rotor Ra is switched to the blocking attitude while keeping the driven rotor Rb in the communicating attitude.

When the rotary valve A switches from the first position (I) to the second position (II), the pair of contact ribs 7 is moved, so that the first contact surfaces 7a of the pair of contact ribs 7 and the first contacted surfaces 8a of the pair of contacted ribs 8 come into contact with each other.

As a result, in the second position (II), cooling water supplied to the first supply port 11 flows through the opening 5a of the disk portion 5 of the drive rotor Ra into the third discharge port 15 and further flows into the third discharge channel 18 of the channel housing 3. Cooling water supplied to the second supply port 12 flows into the second discharge port 14 and further flows into the second discharge channel 17 of the channel housing 3.

[Switching Mode: Third Position (III)]

As shown by the position (III) in the lower part of FIG. 4 or the row (III) of FIG. 7, the third position (III) is set by rotating the drive rotor Ra by 90° in the forward direction F from the second position (II) by driving rotation of the electric motor M.

As described above, in the second position (II), the first contact surfaces 7a of the pair of contact ribs 7 and the first contacted surfaces 8a of the pair of contacted ribs 8 are in contact with each other. Therefore, by rotating the drive rotor Ra by 90° in the forward direction F, the drive rotor Ra and the driven rotor Rb are rotated together with the first contact surfaces 7a and the first contacted surfaces 8a contacting each other. The drive rotor Ra is thus switched to the double-communicating attitude, and the driven rotor Rb is switched to the blocking attitude.

As a result, in the third position (III), cooling water supplied to the first supply port 11 flows through the opening 5a of the disk portion 5 of the drive rotor Ra into the third discharge port 15 and at the same time into the first discharge port 13. This cooling water flows from the third discharge port 15 into the third discharge channel 18 and flows from the first discharge port 13 into the first discharge channel 16.

Cooling water supplied to the second supply port 12 flows through the opening 5a of the disk portion 5 of the driven rotor Rb into the third discharge port 15 and further flows into the third discharge channel 18 of the channel housing 3.

[Switching Mode: Fourth Position (IV)]

As shown by the position (IV) in FIG. 5 or the row (IV) of FIG. 7, the fourth position (IV) is set by rotating the drive rotor Ra by 90° in the reverse direction B from the third position (III) by driving rotation of the electric motor M.

As described above, in the third position (III), the first contact surfaces 7a of the pair of contact ribs 7 and the first contacted surfaces 8a of the pair of contacted ribs 8 are in contact with each other. Therefore, by rotating the drive rotor Ra by 90° in the reverse direction B, the first contact surfaces 7a are separated from the first contacted surfaces 8a, and the second contact surfaces 7b of the pair of contact ribs 7 are brought into contact with the second contacted surfaces 8b of the pair of contacted ribs 8. As described above, by rotating the drive rotor Ra in the reverse direction B, the drive rotor Ra is switched to the blocking attitude while keeping the driven rotor Rb in the blocking attitude.

When switching from the third position (III) to the fourth position (IV), the driven rotor Rb is not rotated. However, as the drive rotor Ra is rotated, the positional relationship is achieved in which the second contact surfaces 7b of the pair of contact ribs 7 are in contact with the second contacted surfaces 8b of the pair of contacted ribs 8.

As a result, cooling water supplied to the first supply port 11 flows through the opening 5a of the disk portion 5 of the drive rotor Ra into the third discharge port 15, and cooling water supplied to the second supply port 12 flows through the opening 5a of the disk portion 5 of the driven rotor Rb into the third discharge port 15. The cooling water further flows into the third discharge channel 18 of the channel housing 3.

As described above, the channel of the rotary valve A can be set to the first position (I) by further driving and rotating the drive rotor Ra by 90° in the reverse direction B after setting the rotary valve A to the fourth position (IV).

Therefore, after the rotary valve A is set to the first position (I) by rotating the drive rotor Ra by 90° in the reverse direction B from the fourth position (IV), the rotary valve A can be set to the first position (I), the second position (II), the third position (III), and the fourth position (IV) by the above series of sequential rotations to control the flow of cooling water.

Functions and Effects of Embodiment

As described above, the drive rotor Ra and the driven rotor Rb are housed in the valve housing 1 and linked by the linkage mechanism L. Therefore, by setting the rotational direction of the driving rotation of the electric motor M, fluid from the two supply ports Pa can be selectively sent to the three discharge ports Pb.

With this configuration, the two supply ports Pa are arranged in a row on the front side of the valve housing 1, and the three discharge ports Pb are arranged on the bottom side of the valve housing 1. Therefore, the flow of cooling water can be controlled without making the flow at an acute angle. Accordingly, this configuration does not increase the internal channel resistance. Moreover, as compared to a rotary valve having a plurality of ports projecting outward in a radial pattern, this configuration does not cause an increase in size and facilitates placement of hoses because each port projects in a predetermined direction.

The linkage mechanism L is composed of the pair of contact ribs 7 and the pair of contacted ribs 8. Therefore, these ribs are formed integrally with the drive rotor Ra and the driven rotor Rb during molding of the drive rotor Ra and the driven rotor Rb. Accordingly, the linkage mechanism L can be more easily configured than a linkage mechanism using a member different from the rotors R.

Other Embodiments

The present disclosure may be configured as follows in addition to the above embodiment (portions having the same functions as those of the above embodiment are denoted by the same numerals and signs as those of the above embodiment).

(a) The linkage mechanism L is not limited to the rib shape. For example, the linkage mechanism L may have a configuration in which a protruding end of a protruding body formed on the drive rotor Ra is fitted in a recess formed in the driven rotor Rb. Alternatively, the linkage mechanism L may have a configuration in which a protruding end of a protruding body formed on the driven rotor Rb is fitted in a recess formed in the drive rotor Ra.

Of these configurations, in the former configuration, the protruding body is the contact portion, and a portion of the recess that is contacted by the projecting body is the contacted portion. In the latter configuration, the protruding body is the contacted portion, and the portion of the recess that is contacted by the projecting body is the contact portion.

(b) For example, the rotary valve A is formed by disposing the drive rotor Ra in the middle and disposing the driven rotors Rb on both sides of the drive rotor Ra with the drive rotor Ra therebetween in the direction along the rotation axis P. With this configuration, the flow of fluid can be controlled by the three rotors R.

(c) For example, the rotary valve A is formed by arranging a plurality of rotor sets, each consisting of a drive rotor Ra, a driven rotor Rb, and a linkage mechanism L that links these rotors, along the rotation axis P and disposing a linear drive coaxially with the rotation axis P. This drive shaft is driven and rotated by the electric motor M.

In the rotary valve A of this yet another embodiment (c), the drive shaft is disposed so as to extend through (skewer) the plurality of drive rotors Ra and the plurality of driven rotors Rb, so that the plurality of drive rotors Ra is configured to rotate with the drive shaft. With this configuration, the driven rotors Rb can be rotated in conjunction with the drive rotors Ra. As a result, the flow of fluid can be controlled by many rotors R.

(d) Either or both of the drive rotor Ra and the driven rotor Rb includes, for example, three or more disk portions 5, and the control plate portion 6 is disposed at a position sandwiched between the plurality of disk portions 5, so that fluid flowing from adjacent supply ports Pa to a plurality of discharge ports Pb is controlled.

In the configuration of this further embodiment (d), the valve housing 1 includes a plurality of supply ports Pa and a plurality of discharge ports Pb for one rotor R.

INDUSTRIAL APPLICABILITY

The present disclosure is applicable to rotary valves.

DESCRIPTION OF THE REFERENCE NUMERALS

1 Housing (Valve Housing)
5 Disk Portion
5a Opening
6 Control Plate Portion
7 Contact Rib (Contact Portion, Rib-Like Body)
7a First Contact Surface
7b Second Contact Surface
8 Contacted Rib (Contacted Portion, Rib-Like Body)
8a First Contacted Surface
8b Second Contacted Surface
11 First Supply Port (Supply Port)
12 Second Supply Port (Supply Port)
13 First Discharge Port (Discharge Port)
14 Second Discharge Port (Discharge Port)
15 Third Discharge Port (Intermediate Discharge Port)
A Rotary Valve
L Linkage Mechanism
M Electric Motor (Electric Actuator)
Pa Supply Port
Pb Discharge Port
Q1 First Region
Q2 Second Region
R Rotor
Ra Drive Rotor (Rotor)
Rb Driven Rotor (Rotor)
P Rotation Axis
(I) First Position (Initial Position)
(II) Second Position (Contact Position)
(III) Third Position
(IV) Fourth Position

The invention claimed is:

1. A rotary valve comprising:
a housing including a plurality of supply ports to which fluid is supplied and a plurality of discharge ports from which fluid is sent;
a plurality of rotors housed in the housing so as to be rotatable about a rotation axis, and each configured to rotate to cause the fluid from the plurality of supply ports to flow into a corresponding one of the plurality of discharge ports;
a linkage mechanism configured to cause the plurality of rotors to rotate in conjunction with each other; and
an electric actuator configured to drive and rotate the plurality of rotors, wherein
the plurality of rotors includes a drive rotor to which a driving rotational force of the electric actuator is transmitted and a driven rotor to which the driving rotational force is transmitted from the drive rotor via the linkage mechanism,
the linkage mechanism includes a contact portion formed in the drive rotor and a contacted portion formed in the driven rotor, and is configured to select between a transmission mode and a non-transmission mode by selecting a rotational direction of the drive rotor, the transmission mode being a mode in which the contact portion is in contact with the contacted portion so as to transmit the driving rotational force to the driven rotor, and the non-transmission mode being a mode in which the contact portion is separated from the contacted portion so as not to transmit the driving rotational force to the driven rotor,
the drive rotor and the driven rotor are in such a positional relationship that the drive rotor and the driven rotor are located next to each other in a direction along the rotation axis, and
each of the contact portion and the contacted portion is located on a circumference of an imaginary circle about the rotation axis, either or both of the number of the contact portions and the number of the contacted portions are two or more, and either or both of the two or more contact portions and the two or more contacted portions are located at positions separated from each other in a circumferential direction of the imaginary circle.

2. The rotary valve according to claim 1, wherein
the linkage mechanism includes a pair of the contact portions located at positions sandwiching the rotation axis, and a pair of the contacted portions located at positions sandwiching the rotation axis,
each of the contact portions includes a first contact surface and a second contact surface that are perpendicular to a tangential direction to the imaginary circle, and each of the contacted portions includes a first contacted surface and a second contacted surface that are perpendicular to the tangential direction to the imaginary circle,
the rotary valve is switched from an initial position in which the second contact surfaces of the pair of contact portions and the second contacted surfaces of the pair of contacted portions are in contact with each other to a contact position in which the first contact surfaces of the contact portions are in contact with the first contacted surfaces of the pair of contacted portions, the rotary valve being switched from the initial position to the contact position by rotating the drive rotor by a set angle in one direction by the electric actuator in the non-transmission mode in which the pair of contact portions and the pair of contacted portions are separated from each other, and
the electric actuator is then further driven and rotated in the one direction to rotate the drive rotor and the driven rotor together in the transmission mode with the pair of contact portions and the pair of contacted portions contacting each other.

3. The rotary valve according to claim 2, wherein
the single drive rotor and the single driven rotor are housed in the housing,
the housing includes two of the supply ports and two of the discharge ports that correspond to the drive rotor and the driven rotor, and further includes an intermediate discharge port at an intermediate position between the drive rotor and the driven rotor, and
either or both of the drive rotor and the driven rotor is configured to be set as desired to a communicating attitude in which the fluid supplied to a corresponding one of the supply ports is sent to the discharge port and a blocking attitude in which the fluid supplied to the corresponding supply port is sent to the intermediate discharge port without being sent to the discharge port.

4. The rotary valve according to claim 3, wherein
each of the drive rotor and the driven rotor includes
a pair of disk portions having a disk shape about the rotation axis and located at positions sandwiching the corresponding supply port and the discharge port in an attitude perpendicular to the rotation axis,
a control plate portion formed integrally with the pair of disk portions at an intermediate position between the pair of disk portions and dividing each of the drive rotor and the driven rotor into a first region and a second region, and
an opening that is located in the disk portion of each of the drive rotor and the driven rotor that faces the intermediate discharge port, and that communicates with the second region, and
each of the drive rotor and the driven rotor is in the communicating attitude when the first region faces the corresponding supply port, and in the blocking attitude when the second region faces the corresponding supply port.

5. The rotary valve according to claim 4, wherein
either or both of the contact portion and the contacted portion is configured as a rib-like body extending along the rotation axis at a position near an inner periphery of the housing, and
when the control plate portion is in the communicating attitude, the rib-like body is located at a position overlapping the intermediate discharge port.

6. A rotary valve comprising:
a housing including a plurality of supply ports to which fluid is supplied and a plurality of discharge ports from which fluid is sent;
a plurality of rotors housed in the housing so as to be rotatable about a rotation axis, and each configured to rotate to cause the fluid from the plurality of supply ports to flow into a corresponding one of the plurality of discharge ports;
a linkage mechanism configured to cause the plurality of rotors to rotate in conjunction with each other; and
an electric actuator configured to drive and rotate the plurality of rotors, wherein
the plurality of rotors includes a drive rotor to which a driving rotational force of the electric actuator is transmitted and a driven rotor to which the driving rotational force is transmitted from the drive rotor via the linkage mechanism,
the linkage mechanism includes a contact portion formed in the drive rotor and a contacted portion formed in the driven rotor, and is configured to select between a transmission mode and a non-transmission mode by selecting a rotational direction of the drive rotor, the transmission mode being a mode in which the contact portion is in contact with the contacted portion so as to transmit the driving rotational force to the driven rotor, and the non-transmission mode being a mode in which the contact portion is separated from the contacted portion so as not to transmit the driving rotational force to the driven rotor
the plurality of supply ports includes a first supply port and a second supply port, and the plurality of discharge ports includes a first discharge port, a second discharge port, and a third discharge port, and
by driving and rotating the drive rotor by the electric actuator, the rotary valve is switched to
a first position in which the first supply port and the first discharge port communicate with each other and the second supply port and the second discharge port communicate with each other,
a second position in which the first supply port and the third discharge port communicate with each other and the second supply port and the second discharge port communicate with each other,
a third position in which the first supply port and the second supply port communicate with the third discharge port and the first supply port and the first discharge port communicate with each other, and
a fourth position in which the entire first supply port and the entire second supply port communicate with the third discharge port.

7. The rotary valve according to claim 2, wherein
the single drive rotor and the single driven rotor are housed in the housing,
the housing includes two of the supply ports and two of the discharge ports that correspond to the drive rotor and the driven rotor, and further includes an intermediate discharge port at an intermediate position between the drive rotor and the driven rotor, either or both of the drive rotor and the driven rotor is configured to be set as desired to a communicating attitude in which the fluid supplied to a corresponding one of the supply ports is sent to the discharge port, a blocking attitude in which the fluid supplied to the corresponding supply port is sent to the intermediate discharge port without being sent to the discharge port, and a double-communicating attitude in which the fluid supplied to the supply port is sent to a corresponding one of the discharge ports and the intermediate discharge port, and the rotary valve is switched to
- a first position in which the drive rotor and the driven rotor are set to the communicating attitude in a state where the contact portions and the contacted portions are in the initial position,
- a second position in which the drive rotor is set to the blocking attitude with the driven rotor kept in the communicating attitude in a state where the contact portions and the contacted portions have been switched to the contact position,
- a third position in which, by rotating the drive rotor by the set angle in the one direction from the second position by the electric actuator, the driven rotor is set to the blocking attitude by transmission of the linkage mechanism from the drive rotor, and the drive rotor is set to the double-communicating attitude, and
- a fourth position in which, by rotating the drive rotor by the set angle in an opposite direction to the one direction from the third position by the electric actuator, the drive rotor is set to the blocking attitude with the driven rotor kept in the blocking attitude.

8. The rotary valve according to claim 3, wherein
the drive rotor and the driven rotor are configured to be set as desired to the communicating attitude, the blocking attitude, and a double-communicating attitude in which the fluid supplied to the supply port is sent to a corresponding one of the discharge ports and the intermediate discharge port, and the rotary valve is switched to
- a first position in which the drive rotor and the driven rotor are both set to the communicating attitude,
- a second position in which, by rotating the drive rotor by a set angle in one direction from the first position by the electric actuator, the drive rotor is set to the blocking attitude with the driven rotor kept in the communicating attitude,
- a third position in which, by rotating the drive rotor by the set angle in the one direction from the second position by the electric actuator, the driven rotor is set to the blocking attitude by transmission of the linkage mechanism from the drive rotor, and the drive rotor is set to the double-communicating attitude, and
- a fourth position in which, by rotating the drive rotor by the set angle in an opposite direction to the one direction from the third position by the electric actuator, the drive rotor is set to the blocking attitude with the driven rotor kept in the blocking attitude.

9. The rotary valve according to claim 1, wherein
the single drive rotor and the single driven rotor are housed in the housing, the housing includes two of the supply ports and two of the discharge ports that correspond to the drive rotor and the driven rotor, and further includes an intermediate discharge port at an intermediate position between the drive rotor and the driven rotor, and either or both of the drive rotor and the driven rotor is configured to be set as desired to a communicating attitude in which the fluid supplied to a corresponding one of the supply ports is sent to the discharge port and a blocking attitude in which the fluid supplied to the corresponding supply port is sent to the intermediate discharge port without being sent to the discharge port.

10. The rotary valve according to claim 9, wherein
each of the drive rotor and the driven rotor includes
- a pair of disk portions having a disk shape about the rotation axis and located at positions sandwiching the corresponding supply port and the discharge port in an attitude perpendicular to the rotation axis,
- a control plate portion formed integrally with the pair of disk portions at an intermediate position between the pair of disk portions and dividing each of the drive rotor and the driven rotor into a first region and a second region, and
- an opening that is located in the disk portion of each of the drive rotor and the driven rotor that faces the intermediate discharge port, and that communicates with the second region, and each of the drive rotor and the driven rotor is in the communicating attitude when the first region faces the corresponding supply port, and in the blocking attitude when the second region faces the corresponding supply port.

11. The rotary valve according to claim 10, wherein
either or both of the contact portion and the contacted portion is configured as a rib-like body extending along the rotation axis at a position near an inner periphery of the housing, and when the control plate portion is in the communicating attitude, the rib-like body is located at a position overlapping the intermediate discharge port.

12. The rotary valve according to claim 9, wherein
the drive rotor and the driven rotor are configured to be set as desired to the communicating attitude, the blocking attitude, and a double-communicating attitude in which the fluid supplied to the supply port is sent to a corresponding one of the discharge ports and the intermediate discharge port, and the rotary valve is switched to
- a first position in which the drive rotor and the driven rotor are both set to the communicating attitude,
- a second position in which, by rotating the drive rotor by a set angle in one direction from the first position by the electric actuator, the drive rotor is set to the blocking attitude with the driven rotor kept in the communicating attitude,
- a third position in which, by rotating the drive rotor by the set angle in the one direction from the second position by the electric actuator, the driven rotor is set to the blocking attitude by transmission of the linkage mechanism from the drive rotor, and the drive rotor is set to the double-communicating attitude, and
- a fourth position in which, by rotating the drive rotor by the set angle in an opposite direction to the one direction from the third position by the electric actuator, the drive rotor is set to the blocking attitude with the driven rotor kept in the blocking attitude.

13. A rotary valve comprising:
a housing including a plurality of supply ports to which fluid is supplied and a plurality of discharge ports from which fluid is sent;
a plurality of rotors housed in the housing so as to be rotatable about a rotation axis, and each configured to rotate to cause the fluid from the plurality of supply ports to flow into a corresponding one of the plurality of discharge ports;
a linkage mechanism configured to cause the plurality of rotors to rotate in conjunction with each other; and
an electric actuator configured to drive and rotate the plurality of rotors, wherein
the plurality of rotors includes a drive rotor to which a driving rotational force of the electric actuator is transmitted and a driven rotor to which the driving rotational force is transmitted from the drive rotor via the linkage mechanism,
the linkage mechanism includes a contact portion formed in the drive rotor and a contacted portion formed in the driven rotor, and is configured to select between a transmission mode and a non-transmission mode by selecting a rotational direction of the drive rotor, the transmission mode being a mode in which the contact portion is in contact with the contacted portion so as to transmit the driving rotational force to the driven rotor, and the non-transmission mode being a mode in which the contact portion is separated from the contacted portion so as not to transmit the driving rotational force to the driven rotor,
the single drive rotor and the single driven rotor are housed in the housing,
the housing includes two of the supply ports and two of the discharge ports that correspond to the drive rotor and the driven rotor, and further includes an intermediate discharge port at an intermediate position between the drive rotor and the driven rotor, and
either or both of the drive rotor and the driven rotor is configured to be set as desired to a communicating attitude in which the fluid supplied to a corresponding one of the supply ports is sent to the discharge port and a blocking attitude in which the fluid supplied to the corresponding supply port is sent to the intermediate discharge port without being sent to the discharge port.

14. The rotary valve according to claim 13, wherein
each of the drive rotor and the driven rotor includes
a pair of disk portions having a disk shape about the rotation axis and located at positions sandwiching the corresponding supply port and the discharge port in an attitude perpendicular to the rotation axis,
a control plate portion formed integrally with the pair of disk portions at an intermediate position between the pair of disk portions and dividing each of the drive rotor and the driven rotor into a first region and a second region, and
an opening that is located in the disk portion of each of the drive rotor and the driven rotor that faces the intermediate discharge port, and that communicates with the second region, and
each of the drive rotor and the driven rotor is in the communicating attitude when the first region faces the corresponding supply port, and in the blocking attitude when the second region faces the corresponding supply port.

15. The rotary valve according to claim 14, wherein
either or both of the contact portion and the contacted portion is configured as a rib-like body extending along the rotation axis at a position near an inner periphery of the housing, and
when the control plate portion is in the communicating attitude, the rib-like body is located at a position overlapping the intermediate discharge port.

16. The rotary valve according to claim 13, wherein
the drive rotor and the driven rotor are configured to be set as desired to the communicating attitude, the blocking attitude, and a double-communicating attitude in which the fluid supplied to the supply port is sent to a corresponding one of the discharge ports and the intermediate discharge port, and
the rotary valve is switched to
a first position in which the drive rotor and the driven rotor are both set to the communicating attitude,
a second position in which, by rotating the drive rotor by a set angle in one direction from the first position by the electric actuator, the drive rotor is set to the blocking attitude with the driven rotor kept in the communicating attitude,
a third position in which, by rotating the drive rotor by the set angle in the one direction from the second position by the electric actuator, the driven rotor is set to the blocking attitude by transmission of the linkage mechanism from the drive rotor, and the drive rotor is set to the double-communicating attitude, and
a fourth position in which, by rotating the drive rotor by the set angle in an opposite direction to the one direction from the third position by the electric actuator, the drive rotor is set to the blocking attitude with the driven rotor kept in the blocking attitude.

* * * * *